(12) United States Patent
Benthien et al.

(10) Patent No.: US 10,272,529 B2
(45) Date of Patent: Apr. 30, 2019

(54) CONNECTION SYSTEM, CONNECTION ARRANGEMENT AND METHOD

(71) Applicant: Airbus Operations GmbH, Hamburg (DE)

(72) Inventors: Hermann Benthien, Hamburg (DE); Andreas Poppe, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 295 days.

(21) Appl. No.: 15/269,317

(22) Filed: Sep. 19, 2016

(65) Prior Publication Data
US 2017/0080536 A1 Mar. 23, 2017

(30) Foreign Application Priority Data

Sep. 21, 2015 (DE) .................... 10 2015 218 074

(51) Int. Cl.
*B23P 19/04* (2006.01)
*B64C 1/06* (2006.01)
*F16C 11/04* (2006.01)
*B64C 1/40* (2006.01)
*F16D 1/10* (2006.01)
(Continued)

(52) U.S. Cl.
CPC ............... *B23P 19/04* (2013.01); *B64C 1/06* (2013.01); *B64C 1/403* (2013.01); *F16C 11/04* (2013.01); *F16C 11/06* (2013.01); *F16D 1/101* (2013.01); *F16D 3/54* (2013.01); *F16D 2001/102* (2013.01)

(58) Field of Classification Search
CPC .......... B23P 19/04; F16C 11/06; F16C 11/04; F16D 3/54; F16D 1/101; F16D 2001/102; B64C 1/06; B64C 1/403
See application file for complete search history.

(56) References Cited

U.S. PATENT DOCUMENTS

| 1,356,024 A | 10/1920 | Sullivan |
| 1,983,007 A * | 12/1934 | Simons ..................... F16D 3/54 |
| | | 464/154 |
| 6,789,450 B1 | 9/2004 | Helfet |
| (Continued) | | |

FOREIGN PATENT DOCUMENTS

| CN | 202746342 U | 2/2013 |
| DE | 102010048243 | 4/2012 |

(Continued)

OTHER PUBLICATIONS

English translation of DE2534582 published on Mar. 11, 2076.*
(Continued)

*Primary Examiner* — Jun S Yoo
(74) *Attorney, Agent, or Firm* — Greer, Burns & Crain, Ltd.

(57) ABSTRACT

A connection system includes two connecting elements each having a respective connecting flange on which a plurality of coupling elements are arranged along a peripheral direction and which has a substantially round external profile; and a coupling belt, on which a plurality of opposing coupling elements are arranged which are configured to form a positive-locking connection with the coupling elements of the two connecting elements for the mutual rotation-proof fixing of the two connecting elements.

12 Claims, 2 Drawing Sheets

(51) Int. Cl.
*F16D 3/54* (2006.01)
*F16C 11/06* (2006.01)

(56) References Cited

U.S. PATENT DOCUMENTS

| | | | |
|---|---|---|---|
| 8,567,288 B1 | 10/2013 | Minnie | |
| 2004/0166945 A1* | 8/2004 | Counter | F16D 3/54 |
| | | | 464/88 |
| 2013/0228667 A1 | 9/2013 | Benthien | |
| 2015/0323053 A1* | 11/2015 | El-Wardany | F16H 55/06 |
| | | | 74/457 |
| 2018/0222034 A1* | 8/2018 | Jackson | B25H 3/04 |

FOREIGN PATENT DOCUMENTS

| | | | |
|---|---|---|---|
| FR | 1223790 A | 6/1960 |
| FR | 3002601 A1 | 8/2014 |
| GB | 110655 A | 11/1917 |

OTHER PUBLICATIONS

German Search Report, dated May 19, 2016 priority document.
European Search Report for corresponding European Patent Application No. 16188729.
Chinese Office Action for corresponding Chinese Patent Application No. 20161096944.6.

\* cited by examiner

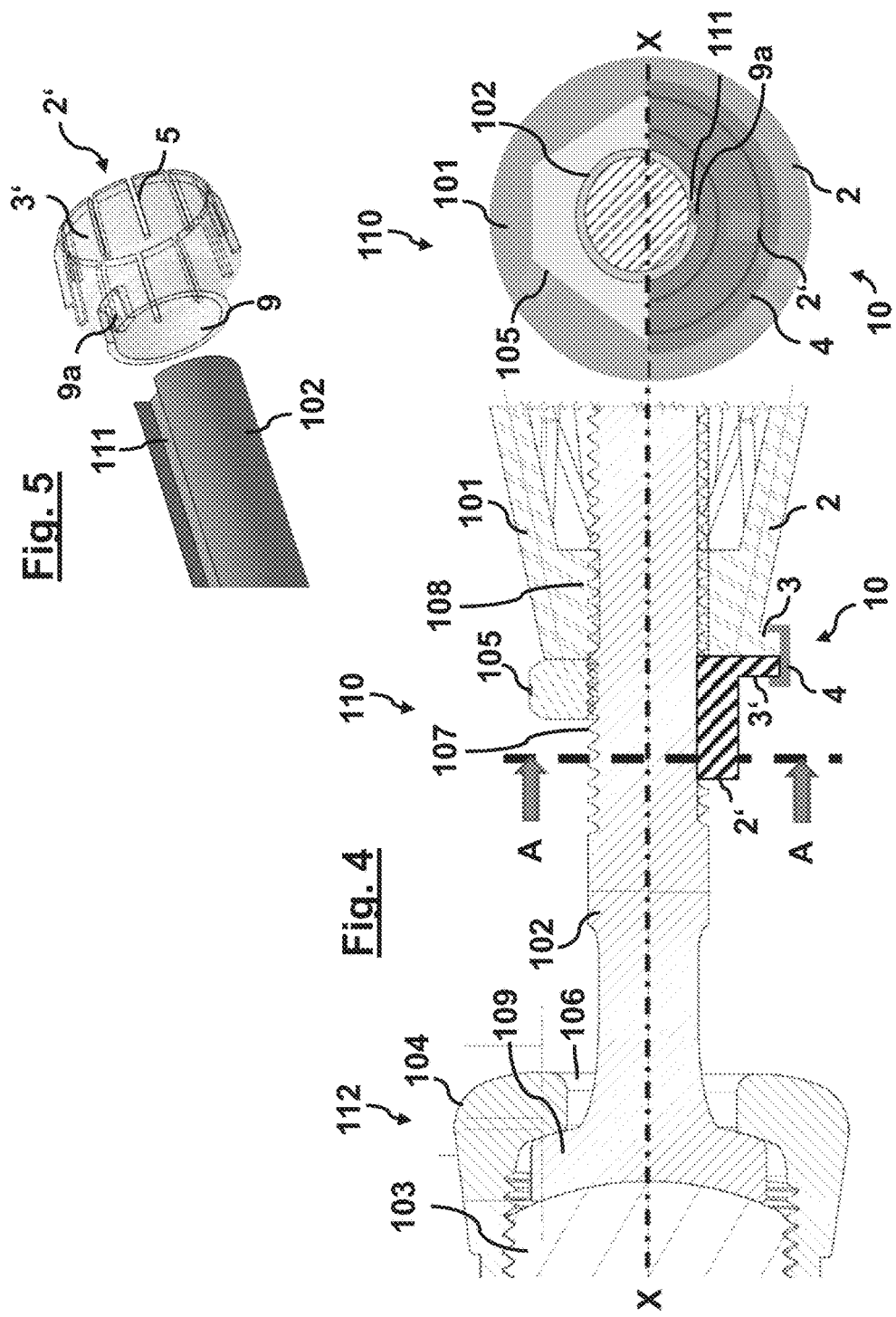

CONNECTION SYSTEM, CONNECTION ARRANGEMENT AND METHOD

CROSS-REFERENCES TO RELATED APPLICATIONS

This application claims the benefit of the German patent application No. 102015218074.3 filed on Sep. 21, 2015, the entire disclosures of which are incorporated herein by way of reference.

FIELD OF THE INVENTION

The present invention relates to a connection system, to a connection arrangement formed with a connection system of this type and to a method for forming a connection arrangement of this type.

BACKGROUND OF THE INVENTION

Although the present invention and the problem which it addresses can be applied to various uses for connecting very different structures, they will be described in detail with regard to the mutual fastening of connection components, as can be used, for example, in aircraft construction or the like.

In aircraft construction, diverse components are attached to the primary structure or inside an aircraft cabin, for example, by means of bars, rods or struts via connecting joints or connecting brackets, cf. for example DE 10 2010 048 243 A1. Furthermore, lattice constructions consisting of a plurality of connecting struts are used, in which the connecting struts are respectively interconnected at their ends, for example via swivel joints or ball-and-socket joints. Depending on the case of use, there is a particular demand to interconnect individual components such that rotational movements of the components relative to one another are restricted. Occasionally, rotation-proof connections of this type between two components are not configured to withstand high torques. Often, however, the connections are to produce just a basic rotation-proof fixing of the two components relative to one another. Thus, for example, there can be a need for two elongate components to be fixed in their axial position relative to one another. For this purpose, for example a metal bracket or a metallic clamp can jointly clamp a respective end piece of the two components.

For example, one of the two components can be a connecting strut and the other component can be a housing nut of a joint connection of the connecting strut or a further connecting strut, etc. One of the two components can be configured with an external thread and the other component can be configured with a corresponding complementary internal thread, so that the two components can be screwed together to form a primary connection. In addition, a metal bracket as described above can fix the screwed-together components relative to one another. A secondary connection of this type ensures that the threaded engagement of the primary connection is also fixed under external influences, such as jolts or other mechanical stresses.

SUMMARY OF THE INVENTION

In view of the above, one of the ideas of the present invention is to find solutions for a positional fixing between two components, which is as lightweight as possible, is easy to assemble and which basically prevents a rotation of the two components relative to one another.

A connection system has two connecting elements with a respective connecting flange on which a plurality of coupling elements are arranged along a peripheral direction and which has a substantially round external profile. The connection system also has a coupling belt, on which a plurality of opposing coupling elements are arranged which are configured to form a positive-locking connection with the coupling elements of the two connecting elements for the mutual rotation-proof fixing of the two connecting elements.

Furthermore, a connection arrangement is provided which is formed with a connection system according to the invention. Here, the connecting flanges of the connecting elements are aligned coaxially to one another. Furthermore, the coupling belt is placed around the external profiles of the connecting flanges. In addition, the coupling elements of the two connecting elements are connected positively to the opposing coupling elements of the coupling belt.

Furthermore, a method for the rotation-proof fixing of the two connecting elements is provided, the rotation-proof fixing being performed by means of the coupling belt. The method comprises the coaxial alignment of the connecting flanges of the connecting elements. The method further comprises placing the coupling belt jointly around the external profiles of the connecting flanges. The method further comprises the positive-locking connection of the coupling elements of the two connecting elements to the opposing coupling elements of the coupling belt.

One of the key ideas of the present invention is to provide a rotation-proof positional fixing between two connecting elements by placing a coupling belt around the two components which are to be connected and thereby forming a plurality of positive-locking connections between the coupling belt and the two connecting elements. A particular advantage of the solution according to the invention is, on one hand, that a connection of this type can be assembled in a particularly fast and simple manner. The two connecting elements merely have to be aligned with their connecting flanges against one another. Thereafter, the coupling belt can be placed around the connecting flanges. The coupling belt can be configured, for example, as a flat and light band of metal or plastic material, so that the solution according to the invention can also be configured to be particularly efficient in terms of weight. At the same time, the solution according to the invention also provides an effective fixing of the two connecting elements against one another, since the connection according to the invention provides a relatively high shear plane. This also makes it possible, inter alia, to use materials which have a relatively low modulus of elasticity, i.e., soft or flexible materials, particularly plastic materials. In principle, the positive-locking connections can be configured for a single use of the coupling belt. Alternatively however, the coupling elements and the opposing coupling elements can also be configured to be detachable, so that the coupling belt can be re-used.

According to some embodiments, the coupling elements or the opposing coupling elements can be configured as pins and correspondingly the opposing coupling elements or the coupling elements can be configured as complementarily formed pin apertures or pin seats. For example, the coupling elements can accordingly be configured as pins and the opposing coupling elements can be configured as complementarily formed pin apertures. Alternatively however, the opposing coupling elements can also be configured as pins and the opposing coupling elements can be configured as complementarily formed pin apertures. In principle, combined configurations of these two examples are also provided, in which, for example, the coupling elements and the opposing coupling elements are alternately configured as pins and as pin apertures.

In some embodiments, the coupling belt can be a cable tie, for example. Consequently, in this particularly simple, lightweight and cost-effective development, a conventional cable tie of plastic material or metal can be placed around the connecting flanges of the two connecting elements. Here, the coupling elements of the connecting elements are accordingly configured so that they can form a positive-locking connection with the opposing coupling elements of the cable tie.

According to some embodiments, the coupling elements or the opposing coupling elements can be configured as barbs and correspondingly the opposing coupling elements or the coupling elements can be configured as loops. In this development, the coupling elements or the opposing coupling elements are accordingly hooked into the loops.

In some embodiments, during interplay, the coupling elements and the opposing coupling elements can form a hook-and-loop fastening. In accordance with the development described above in which the coupling belt is configured as a cable tie, in this development as well it is therefore possible to have recourse to particularly cost-effective, lightweight and easy to assemble solutions. Pressing the coupling elements and the opposing coupling elements, i.e., the connecting elements and the coupling belt, onto one another can result in a fixed but releasable connection.

According to some embodiments, the coupling elements and the opposing coupling elements can be configured as pins. Consequently, in this development, the coupling elements are not formed in a complementary manner to the opposing coupling elements. In contrast to the above developments, the coupling elements and the opposing coupling elements can also be configured identically in particular.

In some embodiments, the coupling elements and the opposing coupling elements can be identical mushroom-shaped pins. In this development, the connecting lock can be achieved analogously to known connection systems, such as 3M™ Dual Lock™ or the like, by hooking identically formed mushroom-shaped pins positively into one another. Here, the term "mushroom-shaped pins" is understood as meaning geometric structures which each comprise a short stem on which is configured a semi-spherical head. A fixed but releasable connection can be produced by pressing the coupling elements and the opposing coupling elements together, i.e., the connecting elements and the coupling belt.

According to some embodiments, the coupling elements can be produced integrally with the respective connecting flange. In addition or alternatively, the opposing coupling elements can also be formed integrally with the coupling belt.

In some embodiments, the connecting elements can be produced from plastic material or metal by a 3D-printing process. In generative or additive production processes, also generally known as "3D-printing processes," starting from a digitalized geometric model of an item, one or more starting materials are superimposed in sequential layers and are cured. Thus, for example, in fused deposition modelling (FDM), a component is constructed in layers from a modelling material, for example plastic material or metal, in that the modelling material is liquefied by heating and is extruded through a nozzle. 3D printing provides exceptional design freedom and allows items to be produced at reasonable expense, which items could not be produced or could only be produced at considerable expense by conventional methods. For this reason, 3D printing methods are currently widely used in industrial design, in the automotive industry, in the aerospace industry or generally in industrial product development in which a resource-efficient process chain is used for the needs-based, small-scale production and mass production of individualized components. Thus, a significant advantage of this development is that the connecting elements and in principle also the coupling belt can be produced simply and economically using the relatively simple means of a 3D printing process.

In the context of the present application, 3D printing processes include all generative and additive production processes in which, based on geometric models, items of a predefined form are produced from formless materials, such as liquids and powders, or form-neutral semi-finished products, such as strip-shaped or wire-shaped material, by means of chemical and/or physical processes in a special generative production system. In the context of the present application, 3D printing processes use additive processes in which the starting material is built up sequentially in layers into predetermined forms.

According to some embodiments, the coupling belt can be configured to vary in length in a peripheral direction. For example, a length adjustment mechanism can be configured analogously to a cable tie, a hose clamp or the like. For example, the coupling belt can be configured as a band which can be provided at one end with an adjusting eye or the like, through which the other end of the band can be guided and can be latched therein. In this development, one embodiment of the coupling belt can thus be used for different connecting elements, i.e., in particular with different diameters of the connecting flange, so that the connection system can be used irrespective of the diameter of the connecting flanges.

According to some embodiments, one of the connecting elements can be configured as a connecting strut, a connecting rod or the like of an aircraft or spacecraft and the other connecting element can be configured as a joint, a mounting, a joint housing, a joint connection, or a connection adapter or the like, for attaching the connecting strut in an aircraft or spacecraft.

According to some embodiments, the connection arrangement can further provide a joint-connecting rod which is provided with an axial external thread. Here, the connecting element configured as a connecting strut can be provided with an axial threaded hole. The axial threaded hole can be configured to receive the axial external thread of the joint-connecting rod. The other connecting element can be configured as an annular connection adapter. The annular connection adapter can be configured with an internal contour, which corresponds to the external contour of the joint-connecting rod, for attachment onto the joint-connecting rod. The connecting element, configured as an annular connection adapter, can be attached onto the joint-connecting rod. The joint-connecting rod can engage in the axial threaded hole in the connecting element, configured as a connecting strut, via the axial external thread.

Thus, in some embodiments, one connecting element is configured as a connecting strut. The other connecting element is configured as a connection adapter for rotation-proof connection with the connecting strut. In turn, the joint-connecting rod can be mounted in a joint. For example, this can be a rotational joint or a ball-and-socket joint or a joint system related thereto, or the like. Here, one end of the joint-connecting rod can serve as a joint head which, for example, rests on a joint base in a joint housing or in a joint socket. For example, the joint can be configured as a rotational/ball-and-socket joint with clearance, so that the joint-connecting rod can be swiveled in the joint vertically to the axis thereof.

The joint-connecting rod can be provided with an external longitudinal groove. The internal contour of the connecting element configured as an annular connection adapter can have a sliding knuckle for sliding in the longitudinal groove in the joint-connecting rod. The sliding knuckle can engage in the longitudinal groove. Thus, in this development, the connection adapter is coupled in a rotation-proof manner to the joint-connecting rod by the engagement of the sliding knuckle in the longitudinal groove, so that the joint-connecting rod is effectively also connected in a rotation-proof manner to the connecting strut. The connection of the connection adapter to the connecting strut via the coupling belt can consequently prevent the threaded engagement of the joint-connecting rod in the connecting strut from being able to loosen due to external influences.

The threaded engagement can serve to some extent as a "primary connection" between a connecting strut and a joint-connecting rod. In addition, the two components can be interconnected in a rotation-proof manner by means of the connection adapter. Thus, here the connection adapter can serve as a "secondary connection." In this development, the connection arrangement can be assembled in an extremely effective and simple manner and in particular no tools are required. For this purpose, the connection adapter can be placed onto the joint-connecting rod. The joint-connecting rod can then be screwed together with the connecting strut. Finally, the two connecting elements, i.e. the connection adapter and the connecting strut, can be fixed against one another by their connecting flanges in a rotation-proof manner by means of the coupling belt. For this purpose, the coupling belt can be placed around the external profiles of the connecting flanges and form-locking connections between the coupling elements of the two connecting elements and the opposing coupling elements of the coupling belt can be closed.

The above embodiments and developments can be combined in any desired, sensible manner. Further possible embodiments, developments and implementations of the invention also include combinations, which have not been explicitly mentioned, of features of the invention which have been previously described or will be described in the following with reference to the embodiments. In particular in this respect, a person skilled in the art will also add individual aspects as improvements or additions to the respective basic form of the present invention.

BRIEF DESCRIPTION OF THE DRAWINGS

In the following, the present invention will be described in more detail with reference to the embodiments which are presented in the schematic drawings, in which:

FIG. 4 is a schematic lateral sectional view (left) and a schematic cross-sectional view along a line A-A (right) of an exemplary connection arrangement (above line X-X) and of a connection arrangement according to a further embodiment of the invention (below line X-X); and FIG. 5 is a schematic perspective view of a connecting element of the connection arrangement from FIG. 4.

DETAILED DESCRIPTION OF THE PREFERRED EMBODIMENTS

Figure 1:
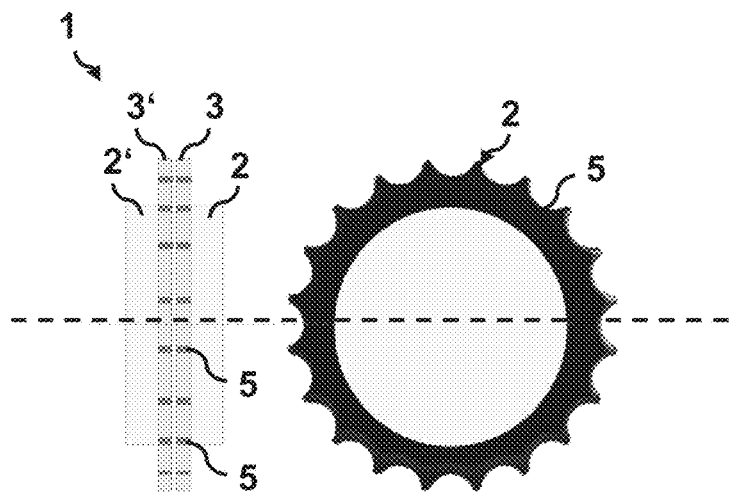
FIG. 1 is a schematic side view (left) and a schematic cross-sectional view (right) of two connecting elements, oriented coaxially to one another, of a connection system of the invention according to an embodiment of the invention.

The accompanying figures are to provide a further understanding of the embodiments of the invention. They illustrate embodiments and, together with the description, they serve to explain principles and concepts of the invention. Other embodiments and many of the mentioned advantages will become apparent with reference to the drawings. The elements of the drawings are not necessarily shown true to scale relative to one another.

In the figures of the drawings, identical, functionally identical and identically operating elements, features and components have been respectively provided with the same reference numerals, unless indicated otherwise.

FIG. 1 is a schematic side view (left) and a schematic cross-sectional view (right) of two connecting elements, aligned coaxially to one another, of a connection system of the invention according to an embodiment of the invention.

In FIG. 1, reference numeral 1 denotes a connection system 1 which comprises a first connecting element 2 and a second connecting element 2'. The two connecting elements 2, 2' are merely shown schematically in FIG. 1 in a greatly simplified view. In general, the connecting elements 2, 2' can be various components which are to be fixed against one another such that they cannot rotate. The connection system 1, described in the following, for connecting two connecting elements 2, 2' by means of a coupling belt 4 can be employed in various uses which relate in particular, for example, to the assembly or connection of constructions in aircraft construction or in general vehicle construction, for example lattice constructions comprising a plurality of connecting struts. For example, the connecting elements 2, 2' can be connecting rods, struts, bars or the like which are configured for the connection of components to a primary structure or to a cabin of an aircraft. In this case, FIG. 1 would merely show the end regions of two such connecting rods. In another example, the first connecting element 2 could be a connecting strut which is connected to an aircraft structure by a joint. In this case, the second connecting element 2' could be, for example, a joint or a joint housing.

The first connecting element 2 has a first connecting flange 3. The connecting flange 3 is formed with a substantially round external profile on which a plurality of coupling elements 5 are arranged along a peripheral direction. The connecting flange 3 can have, for example, the basic shape of a hollow or solid circular cylinder. Correspondingly, the second connecting element 2' has a second connecting flange 3'. The second connecting flange 3' is formed with an external profile which is formed identically to the external profile of the first connecting element 2 and on which a plurality of coupling elements 5 are arranged along the peripheral direction. The first connecting flange 3 of the first connecting element 2 is aligned coaxially (with respect to an axis through the center of the round external profile of the connecting flange) with the second connecting flange 3' of the second connecting element 2' so that the two connecting flanges 3, 3' are opposite one another. For example, it can be provided that the two connecting elements 2, 2' rest edge-to-edge against one another by their connecting flanges 3, 3'. However, the present connection system 1 also provides uses in which the two connecting flanges 3, 3' do not contact one another, but a gap can be present therebetween. For example, one connecting element 2 can be configured as a connecting strut and the other connecting element 2' can be configured as a joint housing of a joint connection of the connecting strut. In this case, for example, a primary connection can already be present between the connecting strut and the joint connection. The connection according to the present invention can in this case just be used, for example, for a secondary (rotation-proof) positional fixing of the connecting strut on the joint, joint housing and/or joint connection. Notwithstanding the above, other embodiments of the connecting elements 2, 2' and of the connecting flanges 3, 3' are also provided. For example, these components could have more complex shapes, in which case only the respective connecting flange 3, 3' itself accordingly has a substantially round external profile. In particular, the first connecting element 2 can be formed differently from the second connecting element 2'.

The connection system 1 also has a coupling belt 4 (not shown in FIG. 1, cf. FIG. 2) which is used for the rotation-proof fixing of the two connecting elements 2, 2' against one another. A plurality of opposing coupling elements 6 are arranged on the coupling belt 4. The opposing coupling elements 6 are configured to form a positive-locking connection with the coupling elements 5 of the two connecting elements 2, 2'. A connection arrangement 10 formed by this connection system 1 is described in more detail below with reference to FIG. 2.

Figure 2:
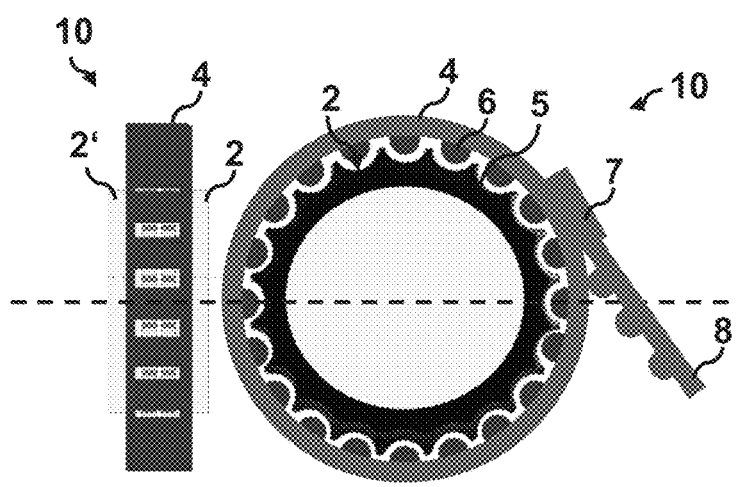
FIG. 2 is a schematic side view (left) and a schematic cross-sectional view (right) of a connection arrangement which is formed with the connecting elements of the connection system from FIG. 1.

FIG. 2 is a schematic side view (left) and a schematic cross-sectional view (right) of a connection arrangement 10 which is formed with the connecting elements 2, 2' of the connection system 1 from FIG. 1.

In FIG. 2, a coupling belt 4 has been placed around the external profile of the first connecting flange 3 and around the external profile of the second connecting flange 3'. The coupling elements 5 of the two connecting elements 2, 2' form a positive-locking connection with the opposing coupling elements 6 of the coupling belt 4. For this purpose, the opposing coupling elements 6 of the coupling belt 4 are configured as protruding pins. Correspondingly, the coupling elements 5 of the connecting elements 2, 2' are formed as complementarily formed recesses. The coupling belt 4 can accordingly be adjusted in length relative to a cable tie, in that one end 8 of the coupling belt 4 is pushed through an adjusting eye 7 so that the end 8 projects downstream of the adjusting eye 7.

The embodiment of the present invention, shown in FIGS. 1 and 2, can be realized in a particularly lightweight form and can be attached in a very fast and convenient manner. For this purpose, the two connecting elements 2, 2' must firstly be oriented relative to one another, thereafter the coupling belt 4 merely has to be placed around the connecting flanges 3, 3' of the connecting elements 2, 2' and a positive locking has to be formed between the coupling elements 5 of the two connecting elements 2, 2' and the opposing coupling elements 6 of the coupling belt 4, for example, in that the coupling belt 4 is pressed simultaneously onto the two connecting flanges 3, 3' so that the coupling elements 5 latch into the opposing coupling elements 6. Here, the coupling belt 4 can itself be conveniently adjusted in length by pulling or pushing an end 8 which projects beyond the adjusting eye 7.

The positive-locking connection 10 of the two connecting elements 2, 2' by the coupling belt 4 fixes said connecting elements in a position relative to one another, so that particularly rotational movements in the axial direction are prevented. A connection arrangement 10 of this type can be used, for example, as a secondary connection between two components, which secondary connection fixes the components together so that they cannot rotate, while an additional primary connection (not shown here) ensures a stable connection in respect of traction or pressure loads.

Figure 3:
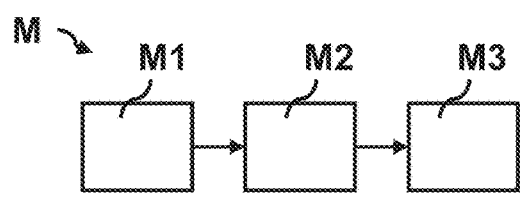
FIG. 3 is a schematic flow chart of a method according to the invention for the rotation-proof fixing of the two connecting elements from FIG. 1.

FIG. 3 is a schematic flow chart for the rotation-proof fixing of the two connecting elements 2, 2' from FIG. 1.

The method M comprises under M1 the step of coaxially aligning the first connecting flange 3 of the first connecting element 2 with the second connecting flange 3' of the second connecting element 2'. Furthermore, the method M comprises under M2 the step of placing the coupling belt 4 jointly around the external profile of the first connecting flange 3 and around the external profile of the second connecting flange 3'. The method further comprises under M3 the step of positively connecting the coupling elements 5 of the two connecting elements 2, 2' to the opposing coupling elements 6 of the coupling belt 4.

FIG. 4 is a schematic lateral sectional view (left) and a schematic cross-sectional view along a line A-A (right) of an exemplary connection arrangement 110 (above line X-X) and of a connection arrangement 10 according to a further embodiment of the invention (below line X-X). For a clearer comparison, the two connection arrangements 10, 110 are presented in a single figure, the lower half of the exemplary connection arrangement 110 not being shown and the upper half of the connection arrangement 10 according to the embodiment of the invention correspondingly not being shown. Line X-X is used here as a transition line between the two views of the two connection arrangements 10, 110.

In the exemplary connection arrangement 110 above line X-X in FIG. 4, a connecting strut 101 is connected to a joint 112 by a joint-connecting rod 102 which is connected thereto. The connection arrangement according to FIG. 4 can form, for example, a segment of a relatively complex two- or three-dimensional lattice or the like, in which further identically, similarly or alternatively formed struts, rods or the like are interconnected by joints. For example, the connection arrangement which is shown can be used in a vehicle, for example in an aircraft, to interconnect or mutually support different structures.

The connecting strut 101 can be formed with an axial threaded hole 108 and the joint-connecting rod 102 can be formed with an axial external thread 107 which is correspondingly formed in a complementary manner thereto. Thus, the connecting strut 101 can be screwed onto the joint-connecting rod 102 by means of the threaded hole 108. For example, a counter nut 105 can also be provided which has a correspondingly formed internal thread. These components can be screwed together, for example using a spanner or a comparable tool.

In this example, the joint-connecting rod 102 has at one end a joint head 109 which terminates with a spherically curved, concave bearing surface. In this example, a joint base 103, cooperating with a joint housing 104, serves as a joint socket for the joint head 109. Accordingly, the joint base 103 is formed with an also spherically curved, but convex bearing surface, the curvature of this surface corresponding exactly to that of the joint head. Furthermore, the joint base 103 is formed with an external thread which engages in a corresponding internal thread of the joint housing 104. The joint housing has a housing opening 106, the diameter of which is smaller than that of the joint head 109. Consequently, the joint head 109 is held in the axial direction in the joint 112 by the joint base 103 and the joint housing 104. However, the external shape of the joint head 109 is dimensioned such that it can swivel in the housing opening 106 with respect to the joint 112. The joint head 109 slides on the concave bearing surface over the convex bearing surface of the joint base. Consequently, the mode of operation of the joint 112 shown in FIG. 4 is similar in principle to that of a ball-and-socket joint. Joints 112 of this type can used, for example, to compensate for tolerances in complex lattice structures.

In the connection arrangement 10 according to the embodiment of the invention below line X-X in FIG. 4, a connecting element 2 which is basically configured similarly to the connecting strut 101 above line X-X, is connected to a joint 112 by a joint-connecting rod 102 which is connected thereto. The fundamental joint connection and the threaded engagement between the joint-connecting rod 102 and the connecting element 2 are configured similarly to that of the connection arrangement above line X-X. However, the connection arrangement 10 below line X-X also has a further connecting element 2' which is configured as an annular connection adapter.

In this regard, FIG. 5 is a schematic perspective view of the connecting element 2' and of the joint-connecting rod 102 of the connection arrangement 10 from FIG. 4. For the sake of clarity, in FIG. 5 the axial external thread 107 of the joint-connecting rod 102 is not shown. The connecting element 2' has an internal contour 9 which corresponds to an external contour of the joint-connecting rod 102, so that the connecting element 2' can be attached onto the joint-connecting rod 102. For this purpose, the joint-connecting rod 102 is provided with an external longitudinal groove 111 and the connecting element 2' is provided with a corresponding sliding knuckle 9a. The connecting element 2' can be attached onto the joint-connecting rod 102 by aligning the sliding knuckle 9a relative to the longitudinal groove 111. As soon as the sliding knuckle 9a engages in the longitudinal groove 111, the sliding knuckle can slide along the longitudinal groove 111. At the same time, the connecting element 2' is connected to the joint-connecting rod 102 in a rotation-proof manner.

Furthermore, the connecting element 2' is configured with a connecting flange 3', corresponding to the connecting elements in FIG. 1. The connecting flange 3' has a substantially round external profile. Furthermore, a plurality of coupling elements 5 are arranged on the connecting flange 3' along a peripheral direction. The connecting element 2, configured as a connecting strut 101, also has a connecting flange 3 and coupling elements 5 located thereon (not shown in FIG. 4). Accordingly, the two connecting elements 2, 2' can be mutually fixed in a rotation-proof manner, in that a coupling belt 4, on which a plurality of opposing coupling elements 6 (also not shown in FIG. 4) are arranged, is placed around the connecting flanges 3, 3' of the two connecting elements 2, 2' and the opposing coupling elements 6 are positively connected to the coupling elements 5 of the two connecting elements 2, 2'.

The connection arrangement 10 in FIG. 4 can be assembled quickly and efficiently in several simple steps without any tools. In the first step, the connecting element 2' can be attached onto the joint-connecting rod 102. Thereafter, the joint-connecting rod 102 can be screwed together with the other connecting element 2'. This "primary connection" can be progressively adjusted by a corresponding rotation of the two components relative to one another. In so doing, the connecting element 2' can slide over the joint-connecting rod 102. As soon as a preferred arrangement is obtained, connecting element 2' can be fixed in a rotation-proof manner with connecting element 2 by means of the coupling belt 4. For this purpose, all that needs to be done is for the coupling belt 4 to be placed around the connecting flanges 3, 3' and to positively connect the coupling elements 5 to the opposing coupling elements 6. A rotation-proof connection between the two connecting elements 2, 2' and thereby also in particular between the joint-connecting rod 102 and the connecting strut 101 is therefore formed. This "secondary connection" can be used, for example, to stabilize the primary connection in respect of external influences. For example, in principle, jolts or other mechanical influences could result in a loosening of the threaded engagement. This is prevented by the secondary connection. Furthermore, the counter nut 105 can be omitted from the exemplary connection arrangement 110.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection arrangement, comprising:
   two connecting elements having a respective connecting flange on which a plurality of coupling elements are arranged along a peripheral direction and which has a substantially round external profile;
   a coupling belt on which a plurality of opposing coupling elements are arranged which are configured to form a positive-locking connection with the coupling elements of the two connecting elements for the mutual rotation-proof fixing of the two connecting elements; and
   a joint-connecting rod which is provided with an axial external thread,
   wherein the coupling belt is placed around the external profiles of the connecting flanges;
   wherein the coupling elements of the two connecting elements are connected positively to the opposing coupling elements of the coupling belt;
   wherein one of the connecting elements is configured as a connecting strut of an aircraft or spacecraft and the other connecting element is configured as a joint, a joint housing, a joint connection, or a connection adapter for attaching the connecting strut in an aircraft or spacecraft;
   wherein the connecting element configured as a connecting strut is provided with an axial threaded hole which is configured to receive the axial external thread of the joint-connecting rod;
   wherein the other connecting element is configured as an annular connection adapter which is configured with an internal contour which corresponds to the external contour of the joint-connecting rod, for attachment onto the joint-connecting rod;
   wherein the connecting element, configured as an annular connection adapter, is attached onto the joint-connecting rod; and wherein the joint-connecting rod engages in the axial threaded hole in the connecting element, configured as a connecting strut, via the axial external thread.

2. The connection arrangement of claim 1, wherein the joint-connecting rod is provided with an external longitudinal groove, wherein the internal contour of the connecting element configured as an annular connection adapter has a sliding knuckle for sliding in the longitudinal groove in the joint-connecting rod, and wherein the sliding knuckle engages in the longitudinal groove.

3. A method for fixing, in a rotation-proof manner, the connection arrangement of claim 1, the method comprising:
    coaxially aligning the connecting flanges of the connecting elements;
    placing the coupling belt jointly around the external profiles of the connecting flanges; and
    positively connecting the coupling elements of the two connecting elements to the opposing coupling elements of the coupling belt.

4. The connection system of claim 1, wherein the coupling elements or the opposing coupling elements are configured as pins and correspondingly the opposing coupling elements or the coupling elements are configured as complementarily formed pin apertures or pin seats.

5. The connection system of claim 4, wherein the coupling belt is a cable tie.

6. The connection system of claim 1, wherein the coupling elements or the opposing coupling elements are configured as barbs and correspondingly the opposing coupling elements or the coupling elements are configured as loops.

7. The connection system of claim 6, wherein during interplay, the coupling elements and the opposing coupling elements form a hook-and-loop fastening.

8. The connection system of claim 1, wherein the coupling elements and the opposing coupling elements are configured as pins.

9. The connection system of claim 8, wherein the coupling elements and the opposing coupling elements are identically formed mushroom-shaped pins.

10. The connection system of claim 1, wherein the coupling elements are produced integrally with the respective connecting flange.

11. The connection system of claim 10, wherein the connecting elements are produced from a plastic material or metal by a 3D printing process.

12. The connection system of claim 1, wherein the coupling belt is configured to vary in length in a peripheral direction.

* * * * *